Patented Dec. 5, 1922.

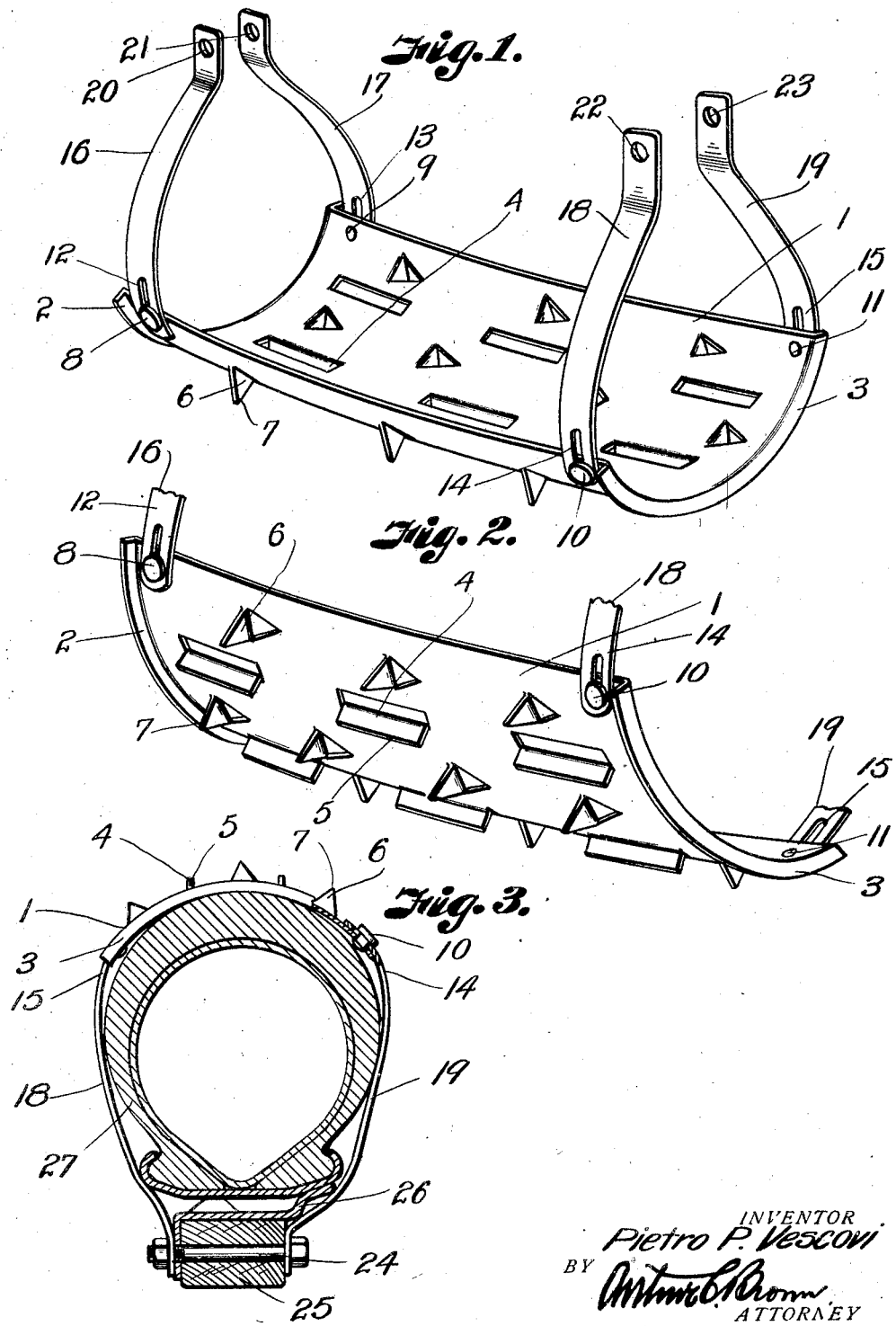

1,438,148

UNITED STATES PATENT OFFICE.

PIETRO P. VESCOVI, OF ARMA, KANSAS.

TRACTION SHOE.

Application filed September 30, 1921. Serial No. 504,324.

*To all whom it may concern:*

Be it known that I, PIETRO P. VESCOVI, a subject of the King of Italy, residing at Arma, in the county of Crawford and State of Kansas, United States of America, have invented certain new and useful Improvements in Traction Shoes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a traction shoe for vehicle tires, the primary object being to provide means whereby skidding will be prevented and better traction can be had than is possible with the ordinary vehicle tire tread.

The invention contemplates a novel construction of attachable and detachable shoe which may be conveniently applied to an existing type of tire and wheel rim to increase the traction between the perimeter of the tire and the road bed, also to insure proper gripping contact with slippery ground or ruts so that the perimeter of the tire can obtain a purchase upon the ground or in the bottom of the rut to assist in utilizing the power of the engine for vehicle propelling purposes.

It sometimes happens that the back wheel of a motor vehicle becomes mired in a rut and unless some means is available for permitting the tire to obtain a grip or purchase upon the ground, the back wheel will spin.

My invention contemplates means for conveniently providing the necessary traction and it also has means for preventing side slipping or skidding. A novel means of attaching the shoe to the wheel is also provided.

In the drawings,

Fig. 1 is a perspective view of a traction device or ground gripping shoe constructed in accordance with my invention.

Fig. 2 is a similar view showing the under side of the shoe, and

Fig. 3 is a cross sectional view through a tire rim and felloe, the shoe being shown in end elevation with parts broken away to illustrate the means of attaching the shoe securing means.

The shoe is shown as comprising a concavo convex member 1, curved transversely to conform to the contour of a tire. The shoe will preferably consist of sheet metal with its ends bent over to form ground-engaging flanges 2 and 3 to resist longitudinal movement of the shoe over the ground when applied to the wheel.

Longitudinally arranged cleats consisting of struckout portions 4 are provided, formed in the body portion of the shoe with the cleats running lengthwise, the edges 5 being adapted to engage the earth to prevent skidding or side slipping as well as to increase the traction of the wheel to which the device is applied.

Triangular, outstanding spurs or tines 6 are also struck-up from the shoe, the extreme ends of which are in the form of points 7 to impinge upon and engage slippery surfaces, such as ice and the like, to prevent slipping of the tire thereover.

The cleats are arranged in substantially parallel rows and between the rows and preferably on each side thereof are arranged the tines or spurs.

At the respective corners of the shoe I prefer to arrange buttons 8, 9, 10 and 11 to engage the slot ends 12, 13, 14 and 15 of the shoe securing straps 16, 17, 18 and 19, the respective straps having at their free ends perforations or openings 20, 21, 22 and 23 to receive the rim bolts 24 passing through the felloe 25 of the wheel. The bolts 24 are preferably the conventional bolts used to secure the rim 26 to the felloe and by removing these and fastening the bolts through the openings in the respective straps, the straps can be fastened to the wheel so that the shoe will be held firmly against the perimeter of the tire 27, which may be of any conventional form.

When the parts are in place, liability of creeping of the shoe upon the tire will be prevented by securing the straps to the felloe through the medium of the bolts. When the device is traveling over the ground, the cleats and end flanges of the shoe will grip the ground with sufficient traction to prevent slipping of the wheel. If the wheel should happen to pass into a rut, the end flanges 2 and 3 will cause a gripping action on the bottom of the rut so that the vehicle may be propelled therethrough. Any tendency for side slipping will be prevented by the longitudinally arranged, elongated cleats while a gripping action can be had on slippery surfaces through the medium of the points on the tines or spurs 6.

It will be apparent that the device can be readily applied to and detached from existing types of wheels and tires without altering the construction thereof and that the shoe will serve as an efficient, durable and inexpensive traction attachment for wheels of the class above referred to.

What I claim and desire to secure by Letters-Patent is:

As a new article of manufacture, a tractor shoe comprising a plate of sheet metal curved transversely to conform to the shape of a vehicle tire and having outstanding, curved flanges at its respective ends, a double row of parallel, longitudinally disposed, outstanding cleats struck up from the sheet metal, and rows of struck-up, triangular-shaped pointed members on the outsides of the cleats and between the rows of cleats, the triangular-shaped members in each row alternating with those in the next row.

In testimony whereof I affix my signature.

PIETRO P. VESCOVI.